United States Patent [19]

Elms

[11] Patent Number: 4,831,174

[45] Date of Patent: May 16, 1989

[54] PRODUCTION OF POLYDIORGANOSILOXANE FLUIDS WITH LOW SILANOL CONTENT

[75] Inventor: Russell A. Elms, Midland, Mich.

[73] Assignee: Dow Corning Corporation, Midland, Mich.

[21] Appl. No.: 140,282

[22] Filed: Dec. 31, 1987

[51] Int. Cl.$^4$ .............................................. C07F 7/08
[52] U.S. Cl. ................................. 556/451; 556/453; 556/462
[58] Field of Search ................ 556/451, 453, 456, 462

Primary Examiner—Paul F. Shaver
Assistant Examiner—Stuart L. Hendrickson
Attorney, Agent, or Firm—Carl A. Yorimoto

[57] ABSTRACT

A continuous process for producing a triorganosilyl end-blocked polydiorganosiloxane fluid with reduced silanol content and reduced branching content is described. The process comprises (a) feeding to a series of two columns packed with an acid-treated clay a liquid siloxane feed mixture, containing as a major portion a polydiorganosiloxane monomer and as a minor portion a triorganosilyl end-blocking material; (b) contacting the liquid siloxane feed mixture with the acid-treated clay in the first and second packed columns, respectively, at a temperature in a range from about 100° to 150° C. at a pressure in a range from about 5 to 1520 mm Hg at a contact time of less than about 15 minutes; (c) separating water vapor from an intermediate mixture between the first and second packed columns; and (d) collecting a product mixture which contains a triorganosilyl end-blocked polydiorganosiloxane fluid with silanol content substantially reduced from the equilibrium mixture.

12 Claims, No Drawings

PRODUCTION OF POLYDIORGANOSILOXANE FLUIDS WITH LOW SILANOL CONTENT

BACKGROUND OF THE INVENTION

This invention relates to a continuous process for the preparation of triorganosilyl end-blocked polydiorganosiloxane fluids using an acid activated clay as the catalyst. More specifically, the instant invention relates to the preparation of these siloxane fluids with reduced silanol content and reduced cleavage of organic groups.

Polydiorganosiloxane fluids with low silanol content exhibit such benefits as improved viscosity stability at elevated temperatures due to improved thermal stability. Chemical means for removing silanol end-blocking such as reaction with a silylating agent such as hexamethyldisilazane are known in the art. However, direct preparation of polydiorganosiloxane fluids with low silanol content from silanol-containing linear siloxane feeds is not so well known.

Triorganosilyl end-blocked polydiorganosiloxane fluids are well known materials in the art. The primary chemical route to producing these fluids is the equilibration (polymerization) of cyclopolydiorganosiloxanes, linear silanol end-blocked polydiorganosiloxanes, or mixtures thereof with an appropriate end-blocking agent such as a hexaorganodisiloxane or a short-chain length triorganosilyl end-blocked polydiorganosiloxane fluid in the presence of an acid or base catalyst. The product of the equilibration process is a mixture of the desired fluid and a lesser amount of cyclopolydiorganosiloxanes.

Japanese Patent Application No. 29868-1956, published May 30, 1959, discloses a process for the continuous production of organosiloxanes of high degree of polymerization, using acidic clay or clay activated with acid or alkali treatment as the equilibration catalyst. No mention is made of the acid or base content of the clay. Cyclopolydiorganosiloxanes and hexamethyldisiloxane are the only organosiloxane feeds mentioned. Temperatures disclosed are 75° to 100° C. It is disclosed that it is possible to apply pressure or vaccuum to facilitate the organosiloxane feed when the need arises.

Siciliano, U.S. Pat. No. 3,853,933, issued Dec. 12, 1974, gives a good summary of early preparation of these siloxane fluids. Early processes for equilibration of polydiorganosiloxane fluids were carried out with soluble acid or base catalysts. The primary difficulty in use of the soluble catalysts was the need to neutralize and to remove the catalyst residue after equilibration. Additionally, in the case of the use of a strong liquid acid such as sulfuric acid, cleavage of the organic substituents of the polydiorganosiloxane fluids attached to silicon atoms posed quality problems with the final fluid.

Workers in the field looked at acids that were chemically or physically bonded to a solid support to further improve the efficiency of the equilibration process for the preparation of triorganosilyl end-blocked polydiorganosiloxane fluids. Cation exchange resins were found to be somewhat suitable for batch processes in which the equilibrating siloxane materials were in prolonged contact with the resins. However, these cation exchange resins were less than suitable for continuous operations because they tended to require prolonged residence times. The cation exchange resins had the additional disadvantage of being quite expensive.

Another type of solid catalyst that was tried in a batch process was acid-treated carbon black. Early types of acid-treated carbon black were unsuitable for continuous equilibration processes since unduly long residence times were needed in a carbon black bed.

Siciliano discusses the use of acid-treated clays. Siciliano points out that acid-treated clays used by early workers were found unsuitable for various reasons, such as the requirement of long residence times in an acid-clay catalyst bed to effect equilibration. Even though many of these problems were solved, Siciliano points out, a process utilizing excessively high temperatures is necessary.

The invention disclosed by Siciliano is a continuous process for producing polydiorganosiloxane oils, the process comprises continuously passing a fluid siloxane mixture through a catalyst bed of acid-activated carbon black having a carbon to acid ratio of 10:1 to 40:1. The catalyst bed is maintained at 85° to 150° C. and the pressure in the bed is maintained at a pressure of 5 to 200 mm Hg. Residence time in the catalyst bed was anywhere from 10 minutes to 4 hours. Siciliano discloses that the equilibrated product from this carbon black bed contains from 100 parts per million to 1 weight percent water. No mention is made of silanol content of the equilibrated fluid.

Siciliano discloses a second, less preferred embodiment of the invention in which two catalyst beds in series, utilizing the acid-activated carbon black, described supra, are used to produce a product stream containing substantially no water. The first catalyst bed is as described, supra, The product from the first bed then passes to a second catalyst bed. The second catalyst bed is maintained at a temperature of 85° to 150° C. at atmospheric pressure. The residence time in the second catalyst bed is anywhere from 10 minutes to 2 hours. Siciliano discloses that the final fluid has a water content of less than 100 parts per million. The only mention made of silanol content of the final fluid is that it is negligible.

Siciliano et al., U.S. Pat. No. 3,853,934, issued Dec. 12, 1974, discloses a process for producing linear polydiorganosiloxane oils, using acid-activated hydroaluminum silicate. The process comprises continuously passing into a first column a siloxane feed mixture and a small amount of the acid-activated hydroaluminum silicate and a diatomaceous earth. No solids appear to be held in this first column. The first column is maintained at a temperature in a range from about 150° to 200° C. at an unspecified pressure. The residence time in the first column is anywhere from 0.5 to 5 hours. The product from the first column contains less than 1000 parts per million water. Siciliano et al., discloses that to operate the process the acid-activated hydroaluminum silicate must have an acid equivalent of 5 to 35 milligrams of KOH per gram of solid and must have a mesh size of 10 to 200 microns. Siciliano et al., go on to state that acidactivated clays other than hydroaluminum silicate and even hydroaluminum silicate that do not have the above specifications will not function in an effective manner in the continuous process of the present invention. The stream from the first column can pass to a surge tank where it is held 150° to 200° C. anywhere from 0.5 to 3 hours. The mixture from the surge tank then passes to a second column, packed with the same acid-activated hydroaluminum silicate, described supra. The siloxane mixture from the surge tank is fed to the second column at a pressure anywhere from 15 to 100 pounds per square inch gauge. The second column is maintained at a temperature of 150° to 200° C. The residence time of the siloxane mixture in the second column is anywhere from 10 minutes to 2 hours. Siciliano et al., discloses that the product from the second column has substantially no water. However, the silanol content is not quantified nor is the branching level of the final fluid mentioned in the invention of Siciliano et al.

SUMMARY OF THE INVENTION

The objective of the present invention is the continuous preparation of triorganosilyl end-blocked polydiorganosiloxane fluids with both low silanol content and low amounts of cleavage of the organic substituents of the polydiorganosiloxanes. A further objective of the instant invention is to provide this fluid with improved quality directly from an equilibration/condensation polymerization scheme without the need for a secondary chemical operation to replace silanol groups with the desired triorganosiloxy groups.

It has been found by the inventor that triorganosilyl end-blocked polydiorganosiloxane fluids can be successfully produced with granular acid-treated clay as the equilibration catalyst from hydroxy end-blocked polydiorganosiloxanes, separately, or from mixtures of hydroxy end-blocked polydiorganosiloxanes and cyclopolydiorganosiloxanes. The granular form of acid-treated clay facilitates preparation of the desired siloxane fluids at moderately low temperatures and short residence times. This finding is contrary to the conclusions presented by Siciliano et al., ('934), supra, in which it is disclosed that very fine acid clay particle size, high temperatures and long residence times are needed to produce these desired fluids.

Utilizing two packed beds of acid clay in series, under temperature, pressure and residence conditions described, infra, a fluid with significantly reduced silanol content can be produced.

A further benefit of the instant invention over the disclosure of Siciliano et al., ('934), is the significantly shorter residence time and lower temperature disclosed in the instant invention to produce the desired fluid. Siciliano et al., discloses contact time up to 5 hours at temperatures of from about 150° to 200° C. when using acid-treated hydroaluminum silicates. The instant invention discloses residence times less than about 15 minutes and temperatures from about 100° to 150° C. An example, infra, illustrates the effect of temperature and residence time upon the rate of cleavage of organic substitutents of siloxane polymers. The higher residence times and temperatures disclosed by Siciliano et al., compared to the temperature and residence times of the instant invention, would significantly increase the level of cleavage or branching. It is projected by the inventor that branching of the fluid produced via the invention of Siciliano et al,. could be as much as three or four times higher than the fluid produced by the instant invention.

DESCRIPTION OF THE INVENTION

In accordance with the instant invention, there is provided a process for continuously producing triorganosilyl end-blocked polydiorganosiloxane fluids with low silanol and low branching content using acid-treated clay as a catalyst under conditions that will be delineated herein. What is described, therefore, is a continuous process for producing a triorganosilyl end-blocked polydiorganosiloxane fluid with reduced silanol content and reduced branching content, wherein said triorganosilyl end-blocked polydiorganosiloxane fluid has a viscosity in a range from about 3 to 5,000 centipoise at 25° C., said process comprising (A) feeding to a first packed column, a liquid siloxane feed mixture, containing as a major portion

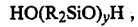

$HO(R_2SiO)_yH$, separately, or as a mixture with

$(R_2SiO)_x$,
and as a minor portion
$(R_3Si)_2O$,

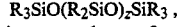

$R_3SiO(R_2SiO)_zSiR_3$, or mixtures thereof, wherein each R is independently selected and is from a group consisting of hydrogen, alkyl groups containing 1 to 6 carbon atoms, alkenyl groups containing 2 to 6 carbon atoms, and aryl groups; wherein x has a value of 3 to 9; wherein y has a value of 1 to 100; and wherein z has a value of 1 to 10, said first packed column being filled with an acid-treated clay which has an acid equivalent in a range from about 5 to 20 milligrams of KOH per gram of acid-treated clay; and wherein the acid-treated clay is a mixture of particles ranging in size from about 300 to 10,000 microns;

(B) contacting said liquid siloxane feed mixture with the acid-treated clay in the first packed column to effect reaction of silanol groups to water and to effect formation of the triorganosilyl endblocked polydiorganosiloxane fluid, wherein said first packed column is maintained at a temperature in a range from about 100° to 150° C.; wherein within said first packed column of the acid-treated clay there is maintained a pressure in a range from about 5 to 1520 mm Hg; and wherein the liquid siloxane feed mixture is in contact with the acid-treated clay for less than about 15 minutes;

(C) taking from said first packed column an intermediate mixture comprising the triorganosilyl endblocked polydiorganosiloxane fluid, and a mixture of $(R_2SiO)_e$ and water; wherein $(R_2SiO)_e$ is a by-product of producing the triorganosilyl end-blocked polydiorganosiloxane fluid; wherein R is defined above and e is 3 to 9, inclusive; and wherein the water is in the form of water vapor in equilibrium with water soluble in the triorganosilyl end-blocked fluid and the $(R_2SiO)_e$;

(D) separating said water vapor from the intermediate mixture;

(E) after separating the water vapor, feeding the intermediate mixture to a second packed column filled with acid-treated clay having an acid equivalent from about 5 to 20 milligrams of KOH per gram of acid-treated clay; and wherein the acid-treated clay is a mixture of particles ranging in size from about 300 to 10,000 microns;

(F) contacting the intermediate mixture with the acid-treated clay in the second packed column to effect further reaction of remaining silanol groups; wherein said second packed column is maintained at a temperature in a range from about 100° to 150° C.; wherein within said packed column of the acid-treated clay there is maintained a pressure in a range from about 5 to 1520 mm Hg; and wherein the intermediate mixture is in contact with the acid-treated clay for less than about 15 minutes; and (G) collecting from said second packed column a product mixture which contains a triorganosilyl end-blocked polydiorganosiloxane fluid with silanol content substantially reduced from the intermediate mixture.

Under the temperature conditions of the instant invention, the liquid siloxane feed mixture undergoes polymerization (equilibration). The silanol endblocked linear siloxanes undergo a condensation reaction, liberating water. The cyclosiloxanes undergo ring opening, and with the linear siloxanes undergo equilibration. The triorganosiloxy materials and water provided endblocking for the resultant fluid polymer. The final level of silanol endblocking or silanol content of the fluid is a function of an ultimate equilibrium established between the fluid and water vapor. In a packed bed reactor, equilibrium is approached, the equilibrium being set by the initial content of free water and silanol entering the packed bed with the liquid siloxane feed and the temperature and pressure conditions. By separating the water vapor following passage of the siloxane materials through a first packed bed, the lowered total water and silanol content of the liquid mixture fed to a second bed of catalyst results in a significantly lowered water vapor content in the second bed, thus resulting in a fluid with significantly lower silanol level exiting the second packed bed. In addition to the silanol/water equilibrium, there is also an ultimate equilibrium between the triorganosilyl end-blocked polydiorganosiloxane fluid and cyclopolydiorganosiloxanes, $(R_2SiO)_e$. Thus, $(R_2SiO)_e$, is a by-product of this equilibration process.

The process of the instant invention can be used to prepare triorganosilyl end-blocked polydiorganosiloxane fluids such as, for example, trimethylsilyl end-blocked polydimethylsiloxane fluids, trimethylsilyl end-blocked polymethylphenylsiloxane fluids, dimethylvinyl end-blocked polydimethylsiloxane fluids, phenylmethylvinyl end-blocked polydimethylsiloxane fluids, and copolymers such as dimethylvinyl end-blocked polydimethyl/polymethylvinyl siloxanes. Preferred fluids are trialkylsilyl end-blocked polydialkylsiloxanes.

The hydroxy end-blocked polydiorganosiloxanes, $HO(R_2SiO)_yH$, can be, for example, $HO[(CH_3)_2SiO]_{50}H$, $HO[(CH_3)(C_2H_5)SiO]_{10}H$, or $HO[CH_3)(C_6H_5)SiO]_5H$.

The cyclopolydiorganosiloxanes, $(R_2SiO)_x$, can be, for example, $[(CH_3)_2SiO]_3$, $[(CH_3)_2SiO]_4$, $[(CH_3)_2SiO]_6$, $[(C_2H_5)_2SiO]_5$, $[(CH_3)(CH=CH_2)SiO]_4$, or $[(CH_3)(C_6H_5)SiO]_4$.

The hexaorganodisiloxane, $(R_3Si)_2O$, can be, for example, $[(CH_3)_3Si]_2O$, $[(C_2H_5)_3Si]_2O$, $[(t-C_4H_9)_3Si]_2O$, $[H(CH_3)_2Si]_2O$, or $[(CH=CH_2)(CH_3)_2Si]_2O$.

The triorganosilyl end-blocked fluid, $R_3SiO(R_2SiO)_z$-$SiR_3$, utilized as an end-blocking source can be, for example,

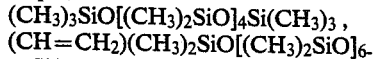
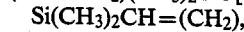
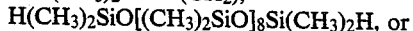
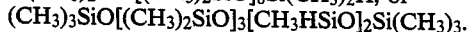

$(CH_3)_3SiO[(CH_3)_2SiO]_4Si(CH_3)_3$,
$(CH=CH_2)(CH_3)_2SiO[(CH_3)_2SiO]_6Si(CH_3)_2CH=(CH_2)$,
$H(CH_3)_2SiO[(CH_3)_2SiO]_8Si(CH_3)_2H$, or
$(CH_3)_3SiO[(CH_3)_2SiO]_3[CH_3HSiO]_2Si(CH_3)_3$.

For the purpose of the instant invention, the term "branching" is a measure of the cleavage of organic groups from the polydiorganosiloxanes. Branching is expressed in terms of branches per million sillicon atoms or "ppm branching". For the instant invention the temperature and contact time conditions, discussed infra, favor lowered branching. As an example, for the preparation of trimethylsilyl end-blocked polydimethylsiloxane fluids branching levels can be maintained at less than about 3000 ppm based upon the weight of the fluid.

For the purposes of the instant invention, the term "acid-treated clay" refers to a naturally occurring hydroaluminum silicate such as the montmorillonite class of clays which has been treated with a strong acid such as phosphoric acid, sulfuric acid, or hydrochloric acid to fix the acid to the surface of the clay. The preferred acids are hydrochloric acid and sulfuric acid. The acid-treated clay can have an acid equivalent, expressed in terms of milligrams of KOH per gram of clay, in a range from about 5 to 20. The preferred acid-treated clay has an acid equivalent in a range from about 15 to 18. A minimum level of acidity is necessary to assure that equilibration of the siloxane materials can be effected in as short a residence time as possible at as low a temperature as possible. The inventor believes that equilibration can be effected with acid-treated clay with an acid equivalent lower than about 5; however, the extent of equilibration at these lower acid equivalents can be more easily disrupted by low levels of such impurities as neutralizing agents and other catalyst poisons. Conversely, acid-treated clay with acid equivalents greater than 20 may be utilized; however, cleavage of organic groups could be significantly increased.

The acid-treated clays is a mixture of solid particles. Generally, the particles should range in size from about 300 to 10,000 microns. Preferably, the solid particles should range in size from about 500 to 1500 microns. This range of particle size is selected so that pressure drop through bed of these solids will be minimal at the conditions of liquid and gas flows of the instant invention.

The two packed columns of acid-treated clay can be a known configuration in which a mixture of vapor and liquid are contacted with a fixed solid. Liquids are fed to the packed bed by conventional means such as pumps or gas pressure.

The liquid feeds to both packed columns can be fed in either a downward, top-to-bottom, configuration or an upward, bottom-to-top, configuration. The liquid feeds to both packed columns are preferably fed to the top of either column in a downward, top-to-bottom, configuration so that the flow of liquids and any vapors formed is downward through the bed of acid-treated clay. Such a flow pattern prevents movement of the clay and appendant problems of agitation and attrition of the solid clay particles.

Vacuum is drawn from the bottom of each column in a top-to-bottom configuration to maintain as low a pressure as possible to drive a maximum of water into the vapor phase. Conversely vacuum is drawn from the top of each column in a bottom-to-top configuration. Because of the pressure drop created by the passage of the liquid siloxane and vapors through the bed of acid-treated clay, the pressure within the bed of acid-treated clays ranges from higher pressure at the feed end of the beds to lower pressures at the discharge end. Pressure over the catalyst beds should be as low as possible to maximize water in the vapor phase for subsequent removal after the first packed column. Preferably, the pressure over the acid-treated clay should be in a range from about 5 to 1520 mm Hg. Because of mechanical limitations and to effect ease of pressure control, pressure of the acid-treated clay is more preferably in a range from about 50 to 1520 mm Hg. Vacuum can be provided by such conventional means as mechanical pumps and liquid or gas aspirators. Pressures above atmospheric (760 mm Hg) at the feed ends of both packed columns can be maintained by such means as gas pressure or mechanical liquid pumps.

The temperature within both packed columns should be in a range from about 100° to 150° C. to effect the desired condensation and equilibration reactions in as short as residence time as possible. The preferred temperature is in a range from about 100° to 140° C. At these pressures and temperatures, the desired condensation and equilibration reactions can occur at contact times for the feeds within each packed column of less than 15 minutes. It has been found that the desired reactions can be completed in a contact time in a range from about 5 to 15 minutes. The shortest contact time possible is preferable to minimize the cleavage of organic groups from the organosiloxanes. Heating of the packed beds to the desired temperature can be effected by such conventional means as passing condensing steam or a hot heat transfer liquid through a jacket surrounding the bed or through heat transfer tubes within the bed. Heating can also be effected by preheating the siloxane feeds before they are passed through the packed columns.

The mixture taken from the first packed column comprises the desired triorganosilyl end-blocked polydiorganosiloxane fluidl, and a mixture of $(R_2SiO)_e$ and water. The $(R_2SiO)_e$ are the cyclopolydiorganosiloxanes which are a by-product of the equilibration to form a triorganosilyl end-blocked polydiorganosiloxane fluid. The water is in the form of water vapor in equilibrium with water soluble in the triorganosilyl end-blocked fluid and the $(R_2SiO)_e$. As noted, supra, the water vapor is in equilibrium with and controls the silanol content of the desired fluid. Separation of water vapor from the mixture significantly reduces the water content of the resulting liquid mixture that is fed to the second packed bed of acid-treated clay. Thus a step-wise reduction of water results in significantly lowered silanol content of the fluid exiting the second column. Silanol content as low as about 20 parts per million, based upon the weight of the final fluid can be realized. This silanol value compares to silanol levels as high as 1000 to 2000 ppm after the first packed bed. For the purposes of the instant invention "silanol content substantially reduced from the intermediate mixture" means that the silanol content of the intermediate mixture fed to the second packed bed is reduced by 50 percent or more. Typically, the reduction of silanol content is as high as 75 to 85 percent.

The separation of water vapor from the mixture exiting the first column can be effected by such known means as separating the vapors from the liquid exiting the first packed bed, condensing the vapors, and separating and discarding the liquid water.

The fluid exiting the second packed column is preferably passed to a conventional stripping operation in which the equilibrium cyclopolydiorganosiloxanes are separated from the product fluid. The separated cyclopolydiorganosiloxanes can be recovered and recycled as a feed to the process.

So that those skilled in the art can better understand and appreciate the instant invention, the following examples are presented. These examples are presented to be illustrative and are not construed to be limiting the claims delineated herein.

EXAMPLE 1:

An apparatus was assembled for the preparation of trimethylsilyl end-blocked polydiorganosiloxane fluids. A single packed bed of acid-treated catalyst was used, the equilibrium mixture being passed through the same bed in a second pass. The packed bed was a column, 2 inches in inside diameter and 31 inches long. The column was jacketed, and the jacket was connected to a recirculating liquid heattransfer system. Temperature control of the packed column was effected by controlling the temperature of the reservoir of heat transfer fluid.

The feed materials were premixed in a stirred vessel. The feed mixture was fed by a positive displacement pump driven by a variable speed drive. The feed line for the feed mixture passed through a heated bath of heat transfer fluid to preheat the feeds. The column was essentially completely packed with the acid-treated clay. Flow of the feeds and subsequent products was directed from the top to the bottom of the packed column. Liquids and vapors from the packed column flowed into a receiver at the bottom of the column. Vapors from the receiver passed through a cooled condenser. Condensed vapors were collected in a second receiver. The column, receivers, and condenser were tied to a mechanical vacuum pump.

The column was fitted with pressure taps and pressure measuring devices to monitor the pressure conditions around the column. The system was also fitted with appropriate temperature monitoring points.

Feeds to the apparatus and products from the column were analyzed for fluid viscosity, free water content, silanol content, and degree of organic group cleavage or branching, and weight loss to determine degree of polymerization. Weight loss is used to determine degree of polymerization; at equilibrium, the content of volatile cyclopolydimethylsiloxanes is approximately 12 weight percent. Weight loss is determined by heating a sample at 300° F. for 24 hours in an oven with recirculating air.

For this evaluation, the column was charged with clay that was treated with hydrogen chloride. The acid-treated clay was purchased from Sud-Chemie AG, Munich, West Germany, as Tonsil Cog®, 15/30 Mesh. The Tonsil Cog® had a particle size distribution in which 85 to 95 percent of the particles were in the range of 550 to 1400 microns. The Tonsil Cog® had an acid equivalent of about 16 mg KOH/g sample. The column was packed to a height of 31 inches with the Tonsil Cog®.

The siloxane feed was a mixture which consisted of 97.5 weight percent of a silanol end-blocked linear polydimethylsiloxane fluid with a silanol content of about 15,000 ppm and 2.5 weight percent of a trimethylsilyl end-blocked polydimethylsiloxane with a trimethylsilyl content of about 35 weight percent.

The feed mixture was fed to the top of the column, in a first pass through the bed of acid-treated clay at a flow rate of 124 ml/min. Temperature in the catalyst bed averaged 138° C. A residence time of about 3 to 5 minutes was calculated. Pressure at the bottom of the column was controlled at 100 mm Hg. Pressure at the top of the column stabilized at about 565 mm Hg. Once conditions had stabilized, a sample of the liquid material exiting the bottom of the column was analyzed. The first pass sample is designated as Sample A. The vapors exiting the reactor were condensed. The water was separated and discarded. Siloxane materials were collected and combined with the liquid material exiting the bottom of the column.

After removal of the water the siloxane materials collected from the first pass through the catalyst bed were then fed again to the catalyst bed. The first-pass material was fed to the top of the column at a rate of about 50 to 60 ml/min. Temperature in the catalyst bed was maintained at about 138° C. Pressure at the bottom of the column was controlled at 100 mm Hg. Pressure at the top of the column ran from about 556 to 580 mm Hg. The column was allowed to stabilize, and a sample was taken of the liquid exiting the bottom of the column. This sample is designated as Sample B.

Table 1 is a summary of the results of the various analyses of the materials taken after the first pass and the second pass through the catalyst bed. In Table 1, the fluid viscosity at 25° C., expressed in centistokes, is designated as "Visc"; free water content, expressed in ppm, is designated "Water"; silanol content, expressed in ppm, is designated as "SiOH"; and weight loss, expressed in weight percent, is designated "Wt Loss".

TABLE 1

| Sample | Visc | Water | SiOH | Wt Loss |
|--------|------|-------|------|---------|
| A | 366 | 63 | 584 | 12.8 |
| B | 560 | 39 | 138 | n.a. |

Note: n.a. = Data not available

The above results demonstrate that passing a polydimethylsiloxane fluid, partially equilibrated, through a second catalyst bed under similar conditions of temperature and pressure will significantly reduce the silanol content of the final fluid.

EXAMPLE 2:

Using the apparatus and procedures used in Example 1, a study was made on the effect of temperature and residence time upon the level of organic group cleavage or branching of trimethylsilyl end-blocked polydimethylsiloxane fluids. This study was made over a range of temperature from about 105° to 134° C. and residence time up to 5 minutes. The starting fluid had a branching content of 150 ppm. From the results of this study, for the range of temperatures studied, the increase in branching determined. Table 2 is a summary of the results of this study. In Table 2 temperature, expressed in ° C., is designated "Temp"; residence time, 0, 1, 3, and 5 minutes, respectively, is designated "Time"; branching, expressed in ppm is designated as "Branch".

TABLE 2

| | Branch Temp | | | | |
|---|---|---|---|---|---|
| Time | 105 | 120 | 125 | 130 | 134 |
| 0 | 150 | 150 | 150 | 150 | 150 |
| 1 | 200 | 220 | 280 | 350 | 520 |
| 3 | 280 | 350 | 550 | 780 | 1250 |
| 5 | 350 | 480 | 800 | 1200 | 1900 |

The above results demonstrate that increasing temperature and increasing residence time significantly increases the level of organic group cleavage.

EXAMPLE 3:

Using similar procedures as used in Example 1, trimethylsilyl end-blocked polydimethylsiloxane fluids were produced on a commercial-sized unit. The commercial-sized unit consisted of two packed beds in series. The commercialsized units, while being significantly larger in scale than the apparatus used in Example 1, were essentially the same mechanical system. Residence times in the commercial-sized units were similar to the small-scale unit of Example 1.

The acid-treated clay used in producing the fluids was Tonsil COG ®, described in Example 1. The siloxane feed was again a mixture a silanol end-blocked linear polydimethylsiloxane fluid with a silanol content of about 15,000 ppm and a trimethylsilyl end-blocked polydimethylsiloxane with a trimethylsilyl content of about 35 weight percent. Several fluids of differing viscosities were prepared, so the proportions of the components of the feed mixture were varied accordingly.

Extended runs were made to produce four levels of final fluid viscosity. These four extended runs are designated Samples C, D, E, and F, respectively. Table 3 is a summary of the conditions at which the various runs were made. The conditions outlined in Table 3 are temperature in each packed bed, in ° C., denoted as "Temp"; pressure at the bottom of each packed bed, in mm Hg, denoted as "Pressure"; and average residence time in each packed bed, in minutes, denoted as "RT".

TABLE 3

| Sample | Temp | Press | RT |
|--------|------|-------|-----|
| C | 125 | 60 | 10.0 |
| D | 125 | 60 | 8.4 |
| E | 135 | 60 | 8.4 |
| F | 140 | 60 | 11.2 |

Table 4 is a summary of the results of these extended runs tracking the silanol content of the fluid. In Table 4, results will be reported for the fluid exiting the first and second packed bed, denoted as "Bed 1" and "Bed 2", respectively. The results reported are silanol content, in ppm by weight, denoted as "SiOH"; viscosity, in centipoise at 25° C., denoted as "Visc"; and branching in ppm, denoted as "Branch".

TABLE 4

| | Bed 1 | | | Bed 2 | | |
|---|---|---|---|---|---|---|
| Sample | SiOH | Visc | Branch | SiOH | Visc | Branch |
| C | 800 | 26 | 825 | 95 | 31 | 2500 |
| D | 1230 | 55 | 410 | 290 | 66 | 1760 |
| E | 1180 | 161 | 800 | 250 | 239 | 2400 |
| F | 637 | 455 | 1590 | 197 | 595 | 2450 |

The above results further demonstrate that passing a polydimethylsiloxane fluid, partially equilibrated, through a second catalyst bed under these conditions will significantly reduce the silanol content of the final fluid. Additionally, the results demonstrate the levels of branching that can be attained at these conditions.

What is claimed is:

1. A continuous process for producing a triorganosilyl end-blocked polydiorganosiloxane fluid with reduced silanol content and reduced branching content, wherein said triorganosilyl end-blocked polydiorganosiloxane fluid has a viscosity in a range from about 3 to 5,000 centipoise at 25° C., said process comprising
   (A) feeding to a first packed column, a liquid siloxane feed mixture, containing as a major portion $HO(R_2SiO)_yH$, separately, or as a mixture with $(R_2SiO)_x,$ and as a minor portion $(R_3Si)_2O,$ $R_3SiO(R_2SiO)_zSiR_3,$ or mixtures thereof, wherein each R is independently selected and is from a group consisting of hydrogen, alkyl groups containing 1 to 6 carbon atoms, alkenyl groups containing 2 to 6 carbon atoms, and aryl groups; wherein x has a value of 3 to 9; wherein y has a value of 1 to 100; and wherein z has a value of 1 to 10, and further wherein at least one $SiR_3$ group is triorganosilyl, said first packed column being filled with an acid-treated clay which has an acid equivalent in a range from about 5 to 20 milligrams of KOH per gram of acid-treated clay; and wherein the acid-treated clay is a mixture of solid particles ranging in size from about 300 to 10,000 microns;

(B) contacting said liquid siloxane feed mixture with the acid-treated clay in the first packed column to effect reaction of silanol groups to water and to effect formation of the triorganosilyl end-blocked polydiorganosiloxane fluid, wherein said first packed column is maintained at a temperature in a range from about 100° to 150° C.; wherein within said first packed column of the acid-treated clay there is maintained a pressure in a range from about 5 to 1520 mm Hg; and wherein the liquid siloxane feed mixture is in contact with the acid-treated clay for less than about 15 minutes;

(C) taking from said first packed column an intermediate mixture comprising the triorganosilyl end-blocked polydiorganosiloxane fluid, and a mixture of $(R_2SiO)_e$ and water; wherein $(R_2SiO)_e$ is a by-product of producing the triorganosilyl end-blocked polydiorganosiloxane fluid; wherein R is defined above, and e is 3 to 9, inclusive; and wherein the water is in the form of water vapor in equilibrium with water soluble in the triorganosilyl end-blocked fluid and the $(R_2SiO)_e$;

(D) separating said water vapor from the intermediate mixture;

(E) after separating the water vapor, feeding the intermediate mixture to a second packed column filled with acid-treated clay having an acid equivalent from about 5 to 20 milligrams of KOH per gram of acid-treated clay; and wherein the acid-treated clay is a mixture of solid particles ranging in size from about 300 to 10,000 microns;

(F) contacting the intermediate mixture with the acid-treated clay in the second packed column to effect further reaction of remaining silanol groups; wherein said second packed column is maintained at a temperature in a range from about 100° to 150° C.; wherein within said packed column of the acid-treated clay there is maintained a pressure in a range from about 5 to 1520 mm Hg; and wherein the intermediate mixture is in contact with the acid-treated clay for less than about 15 minutes; and (G) collecting from said second packed column a product mixture which contains a triorganosilyl end-blocked polydiorganosiloxane fluid with silanol content substantially reduced from the intermediate mixture.

2. A process according to claim 1, wherein each R is independently selected from alkyl groups containing 1 to 6 carbon atoms.

3. A process according to claim 1, wherein the acid-treated clay is treated with an acid selected from a group consisting of sulfuric acid and hydrochloric acid.

4. A process according to claim 1, wherein the acid-treated clay is a mixture of particles ranging in size from about 500 to 1500 microns.

5. A process according to claim 1, wherein the acid-treated clay has an acid equivalent in a range from about 15 to 18 milligrams of KOH per gram of acid-treated clay.

6. A process according to claim 1, wherein temperature within the first packed column and the second packed column, respectively, is in a range from about 100° to 140° C.

7. A process according to claim 1, wherein pressure within the first packed column and the second packed column, respectively, is in a range from about 50 mm to 1520 mm Hg.

8. A process according to claim 1, wherein contact time within the first packed column and the second packed column, respectively, is in a range from about 5 to 15 minutes.

9. A process according to claim 1, wherein separating water vapor from the intermediate mixture comprises condensing water vapor and separating and discarding a water phase from the intermediate mixture.

10. A process according to claim 1, wherein the triorganosilyl end-blocked polydiorganosiloxane fluid is a trimethylsilyl end-blocked polydimethylsiloxane fluid; wherein the fluid siloxane feed contains as a major portion $HO[(CH_3)_2SiO]_yH$ , separately, or as a mixture with $[(CH_3)_2SiO]_x$ , and as a minor portion $(CH_3)_3SiO[(CH_3)_2SiO]_zSi(CH_3)_3$ , wherein the trimethylsilyl end-blocked polydimethylsiloxane fluid has a viscosity in a range from about 30 to 1000 centipoise at 25° C.; wherein said acid-treated clay is treated with hydrochloric acid; wherein the acid-treated clay is a mixture of particles ranging in size from about 500 to 1500 microns; wherein the acid-treated clay has an acid equivalent in a range from about 15 to 18 milligrams of KOH per gram of acid-treated clay; wherein the temperature in the first packed column and the second packed column, respectively, is in a range from about 100° to 140° C.; wherein the pressure within the first packed column and the second packed column, respectively, is in a range from about 50 mm to 1520 mm Hg; wherein the contact time within the first packed column and the second packed column, respectively, is in a range from about 5 to 15 minutes; and wherein the product mixture has a silanol content reduced by greater than 50 percent from the intermediate mixture.

11. A process according to claim 10, wherein the silanol content of the product mixture is less than about 300 parts per million relative to the weight of the product mixture.

12. A process according to claim 10, wherein the branching of the product mixture is less than about 3000 parts per million based upon the weight of the product mixture.

* * * * *